United States Patent
Weige et al.

(10) Patent No.: US 11,851,109 B2
(45) Date of Patent: Dec. 26, 2023

(54) DASHBOARD CARRIER FOR A MOTOR VEHICLE

(71) Applicant: Kirchhoff Automotive Deutschland GmbH, Attendorn (DE)

(72) Inventors: Michael Weige, Finnentrop (DE); Antonio Turco, Sundern (DE); Andreas Bender, Olpe-Neuenkleusheim (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 53 days.

(21) Appl. No.: 17/635,487

(22) PCT Filed: Sep. 7, 2020

(86) PCT No.: PCT/EP2020/074959
§ 371 (c)(1),
(2) Date: Feb. 15, 2022

(87) PCT Pub. No.: WO2021/048057
PCT Pub. Date: Mar. 18, 2021

(65) Prior Publication Data
US 2022/0289304 A1 Sep. 15, 2022

(30) Foreign Application Priority Data
Sep. 10, 2019 (DE) ...................... 10 2019 124 298.3

(51) Int. Cl.
B62D 25/14 (2006.01)
(52) U.S. Cl.
CPC .................... B62D 25/145 (2013.01)
(58) Field of Classification Search
USPC ............. 296/193.01, 193.02, 70, 72
See application file for complete search history.

(56) References Cited

U.S. PATENT DOCUMENTS

| 6,053,567 A * | 4/2000 | Ito | B62D 25/20 |
| | | | 296/205 |
| 7,216,927 B2 * | 5/2007 | Luo | B62D 25/145 |
| | | | 296/70 |

(Continued)

FOREIGN PATENT DOCUMENTS

| CN | 201816652 U | 5/2011 |
| CN | 104742975 A | 7/2015 |

(Continued)

OTHER PUBLICATIONS

Feinis et al.; Translation of Description of DE 10240395; Mar. 18, 2004 (Year: 2004).*

(Continued)

*Primary Examiner* — Amy R Weisberg
*Assistant Examiner* — Veronica M Shull
(74) *Attorney, Agent, or Firm* — POLSON INTELLECTUAL PROPERTY LAW, PC; Margaret Polson; Christopher Sylvain

(57) ABSTRACT

A dashboard carrier for a motor vehicle with a first hollow carrier profile and a second hollow carrier profile. The two carrier profiles are aligned in the longitudinal extension of the dashboard carrier, arranged at a distance from one another, and connected to one another by a carrier connector spanning the distance between the two carrier profiles. The carrier connector connects the two carrier profiles to one another eccentrically and asymmetrically in relation to the longitudinal axis of the carrier profiles. The carrier connector has an attachment portion on each end side thereof and a carrier portion which connects the attachment portions. The carrier connector is connected, with its attachment portions, to a respective circumferential portion of the lateral surface of the two carrier profiles. The carrier portion is arranged radially on or outside an imaginary lateral surface connecting the lateral surfaces of the two carrier profiles, (Continued)

and thus the space located between the mutual-facing ends of the carrier profiles is usable as an installation space for an assembly or component of the vehicle.

19 Claims, 2 Drawing Sheets

(56) References Cited

U.S. PATENT DOCUMENTS

| | | | |
|---|---|---|---|
| 8,950,794 B2 | 2/2015 | Lenkenhoff et al. | |
| 9,340,236 B2 | 5/2016 | Kong | |
| 9,446,799 B2 | 9/2016 | Franzpotter | |
| 9,598,100 B2 | 3/2017 | Enkenhoff | |
| 9,764,764 B2 | 9/2017 | Irle | |
| 10,005,495 B2 | 6/2018 | Töller | |
| 10,577,025 B2 | 3/2020 | Michler | |
| 10,766,529 B2 * | 9/2020 | Kong | B62D 29/008 |
| 10,882,559 B2 | 1/2021 | Gündogan | |
| 11,142,248 B2 | 10/2021 | Günther et al. | |
| 11,148,623 B2 | 10/2021 | Günther et al. | |
| 11,235,720 B2 | 2/2022 | Höning et al. | |
| 11,292,409 B2 | 4/2022 | Töller | |
| 11,505,146 B2 | 11/2022 | Weige | |
| 2010/0052366 A1 | 3/2010 | Schmieder et al. | |
| 2012/0032044 A1 | 2/2012 | Rincon | |
| 2014/0049075 A1 * | 2/2014 | Kasper | B62D 21/02 296/205 |
| 2015/0183469 A1 | 7/2015 | Kong | |
| 2019/0344385 A1 | 11/2019 | Töller | |
| 2022/0009435 A1 | 1/2022 | Günther | |
| 2022/0024399 A1 | 1/2022 | Tlauka | |
| 2022/0258684 A1 | 8/2022 | Günther | |
| 2022/0281532 A1 | 9/2022 | Tentscher | |
| 2022/0297524 A1 | 9/2022 | Günther | |
| 2022/0314912 A1 | 10/2022 | Töller | |
| 2022/0363211 A1 | 11/2022 | Günther | |
| 2023/0039843 A1 | 2/2023 | Gündogan | |

FOREIGN PATENT DOCUMENTS

| | | | |
|---|---|---|---|
| CN | 105492302 A | 4/2016 | |
| CN | 109625097 A | 4/2019 | |
| DE | 10152242 A1 * | 9/2003 | ........... B62D 25/145 |
| DE | 10152242 A1 | 9/2003 | |
| DE | 10240395 A1 * | 3/2004 | ....... B29C 45/14598 |
| DE | 10029813 B4 | 4/2005 | |
| DE | 102011014710 A1 | 9/2012 | |
| DE | 102012010633 A1 | 12/2013 | |
| DE | 102008045914 B4 | 1/2018 | |
| EP | 1816055 B1 | 8/2007 | |
| EP | 2233385 A1 | 9/2010 | |
| JP | 2001328421 A | 11/2001 | |
| JP | 2007161018 A | 6/2007 | |
| JP | 2008051237 A | 3/2008 | |
| JP | 2017159724 A | 9/2017 | |

OTHER PUBLICATIONS

International Search Report dated Mar. 18, 2021 in parent International application PCT/EP2020/074959.

Written Opinion of the International Searching Authority dated Mar. 18, 2021 in parent International application PCT/EP2020/074959. Machine translation provided. Consult official WIPO translation if unclear.

Examination Report dated Aug. 5, 2021 in related German application DE 10 2012 010 633 A1. Machine translation provided.

Examination report dated Mar. 15, 2023 in related Chinese application No. 202080062795.2.

* cited by examiner

DASHBOARD CARRIER FOR A MOTOR VEHICLE

BACKGROUND

The present disclosure relates to a dashboard carrier for a motor vehicle with a first hollow carrier profile and with a second hollow carrier profile, which two hollow carrier profiles are aligned in the longitudinal extension of the dashboard carrier, arranged at a distance from one another, and connected to one another by a carrier connector spanning the distance between the two hollow carrier profiles.

Dashboard carriers of this type are crossmembers that are arranged between the two A-pillars of a motor vehicle. Various assemblies, possibly a head-up display, the pedals, and the steering column, are connected to the dashboard carrier. Such dashboard carriers are also referred to as cross car beams.

Previously known designs of such dashboard carriers have two separate hollow carrier profiles, one on the right-hand side and one on the left-hand side in relation to the longitudinal extension of the vehicle. As described in EP 1 816 055 B1, these two hollow carrier profiles are offset from one another so that they form an overlapping area. Within the overlapping area, the overlapping portions of the two hollow carrier profiles are connected to a carrier connector. The carrier connector of this prior art is part of a component for connecting the steering column. In this prior art, the left-hand hollow carrier profile is provided with a larger diameter than the right-hand hollow carrier profile. The right-hand hollow carrier profile, on the other hand, is longer in its longitudinal extension and extends over the section of the dashboard carrier framed by two floor supports.

DE 10 2008 045 914 B4 discloses a similar embodiment of a crossmember as a dashboard carrier, in which the two hollow carrier profiles are also offset from one another and connected to one another in the overlapping area by a connecting piece formed from two half-shells.

Another similar embodiment is known from U.S. Pat. No. 9,340,236 B2. In this previously known dashboard carrier, the connecting piece is also made of two shells, with one shell also forming the left-hand floor support.

Whereas in these previously known dashboard carriers, the hollow carrier profiles are designed as tubular pieces, DE 100 29 813 B4 discloses a dashboard carrier whose hollow carrier profiles are composed of more shells. These two hollow carrier profiles are also arranged in an overlapping manner and connected to one another in the overlapping area with the aid of a two-legged floor support. Due to the geometry of the hollow carrier profiles, the design options for connecting the necessary assemblies and components cannot be freely selected.

Another dashboard carrier is known from DE 10 2011 014 710 A1, in which the two hollow carrier profiles are arranged at a distance from one another. A carrier connector is used to span the end-side distance between the two hollow carrier profiles. The carrier connector comprises two tubular pieces, which are arranged with the end portion thereof overlapping the respectively adjacent hollow carrier profile. In this case, it is provided that one of the two profiles of the carrier connector is arranged at the front and the other at the rear, based on the x-direction of the vehicle. These two tubular pieces forming the carrier connector are connected to the hollow carrier profiles with a plurality of connector elements, which are provided as disk-like profile portions of an extruded profile. In this prior art, too, the hollow carrier profile on the left is shorter than the one on the right.

The disadvantage of these previously known dashboard carriers is that, due to their crossbeam function, the assemblies and/or vehicle components adjacent thereto have to be grouped around the dashboard carrier. Moreover, it would be desirable if such a dashboard carrier could be reduced in terms of the required individual parts to simplify the manufacturing process and to use identical parts for different dashboard carriers.

SUMMARY

Proceeding from this background, an aspect of the present disclosure is therefore based on proposing a dashboard carrier which takes into account the needs mentioned above.

This is achieved by a generic dashboard carrier of the type mentioned at the outset, wherein:

the two hollow carrier profiles are connected to one another, by the carrier connector, eccentrically and asymmetrically in relation to the longitudinal axis of the hollow carrier profiles to be connected, the carrier connector has an attachment portion on each end side thereof and a carrier portion which connects the attachment portions, and the carrier connector is connected, with one of its two attachment portions, to a respective circumferential portion of the lateral surface of the two hollow carrier profiles, and the carrier portion is arranged radially on or outside an imaginary lateral surface connecting the lateral surfaces of the two hollow carrier profiles, and thus the space located between the mutual-facing ends of the hollow carrier profiles can be used as an installation space for an assembly or a component of the vehicle.

In the case of this dashboard carrier, it is initially provided that the two hollow carrier profiles are connected to one another, by the carrier connector, asymmetrically in relation to the longitudinal axis of the hollow carrier profiles to be connected and thus connected eccentrically and therefore only on one side or only in one side segment in relation to the lateral surface of the hollow carrier profiles. Due to this eccentric and asymmetrical connection with respect to the longitudinal axis of the hollow carrier profiles to be connected, the space located between the mutual-facing ends of the hollow carrier profiles can be used as an installation space for an assembly or a component up to the carrier connector. In this dashboard carrier, the carrier connector is connected to a circumferential portion of the two hollow carrier profiles in the mutual-facing end portions, respectively. The carrier connector itself has two end-side attachment portions. These attachment portions are connected to one another by a carrier portion. The eccentric and asymmetrical connection of the two hollow carrier profiles results from the fact that the carrier portion of the carrier connector is arranged radially on or outside of an imaginary lateral surface connecting the lateral surfaces of the end portions of the hollow carrier profiles. In this way, access to the space between the end portions of the hollow carrier profiles is free all the way around, limited solely by the carrier connector, which laterally connects the hollow carrier profiles on only one side. This makes it possible for an assembly, for example the air conditioning system or any other assembly or other built-in component, to engage in this installation space between the ends of the hollow carrier profiles. Typically, the carrier connector is located with its carrier portion in the area of the underside of the hollow carrier profiles and is thus offset thereto in the z-direction. An embodiment in which the carrier portion of the carrier connector is arranged at a radial distance from the imaginary lateral surface defined above is particularly advantageous. An assembly or a structural component can engage correspondingly deeper into the installation space created in this way between the mutual-facing hollow carrier profiles.

In this dashboard carrier, the carrier connector is offset with the longitudinal extension thereof as relates to the longitudinal axis of the two hollow carrier profiles to be connected by the carrier connector. Thus, this portion of the dashboard carrier cleverly represents an energy absorption portion in the event of a side impact. This property is supported in a design of the dashboard carrier in which, as is provided in one example embodiment, the attachment portions of the carrier portion are arranged at an angle to the longitudinal extension of the carrier portion. The energy absorption capacity of the dashboard carrier can be adjusted via the angle and the length of the attachment portions.

The attachment portions of the carrier connector are preferably arranged at an angle to the longitudinal extension of the carrier portion, the angle enclosed by the attachment portions and the carrier portion being greater than 100°, preferably approximately 120° to 130°. In this way, forces acting on one or both hollow carrier profiles are directed into the carrier connector according to a "Y" pathway and dissipated into the floor assembly when a floor support is attached to the carrier connector, which is preferred. A special feature is that a floor-side support with a single floor support is considered sufficient to meet the requirements placed on such a dashboard carrier. This dashboard carrier is particularly suitable for use in motor vehicles driven by electric motors.

Such a dashboard carrier is therefore of modular construction with its two hollow carrier profiles and the carrier connector. A particular advantage of this design is that the hollow carrier profiles can be identical parts. This is also provided according to one example embodiment. The carrier connector is then located centrally with respect to the longitudinal extension of the dashboard carrier. The use of identical parts has advantages in production. In addition, such an embodiment allows the corresponding components to be connected to the respective hollow carrier profile, regardless of whether the dashboard carrier is used for a left-hand drive or right-hand drive vehicle. It is understood that not only the hollow carrier profiles can be identical parts, but also the subassemblies, each with a hollow carrier profile and the terminal connectors connected to the opposite-facing ends, with which terminal connectors the dashboard carrier is connected to an A-pillar in each case. In the event that a floor-side support is also provided adjacent to the A-pillar, this can also be attached to such a hollow carrier profile as a component of a subassembly designed as an identical part. To create the dashboard carrier, two such subassemblies are then required, which are connected to one another with a carrier connector to complement the dashboard carrier.

The carrier connector is typically connected to the hollow carrier profiles by a welded connection. The ends of the attachment portions have a corresponding contact contour that corresponds to the lateral surface portion of the hollow carrier profiles to which the attachment portions of the carrier connector are to be connected.

The directions used in this design—the x-direction, the y-direction, and the z-direction—are the coordinate directions of a vehicle, the x-direction being the longitudinal extension, the y-direction being the extension in the lateral direction, and the z-direction being the vertical extension (vertical axis) of the vehicle. This coordinate system is applied to the description of the structure in the same way.

With regard to the length of such a dashboard carrier (its extension in the y-direction), the distance between the mutual-facing ends of the hollow carrier profiles can easily amount to 20% to 30% of the longitudinal extension.

BRIEF DESCRIPTION OF THE DRAWINGS

The present disclosure is described below using an example embodiment with reference to the appended figures, wherein.

DETAILED DESCRIPTION

Figure 1:
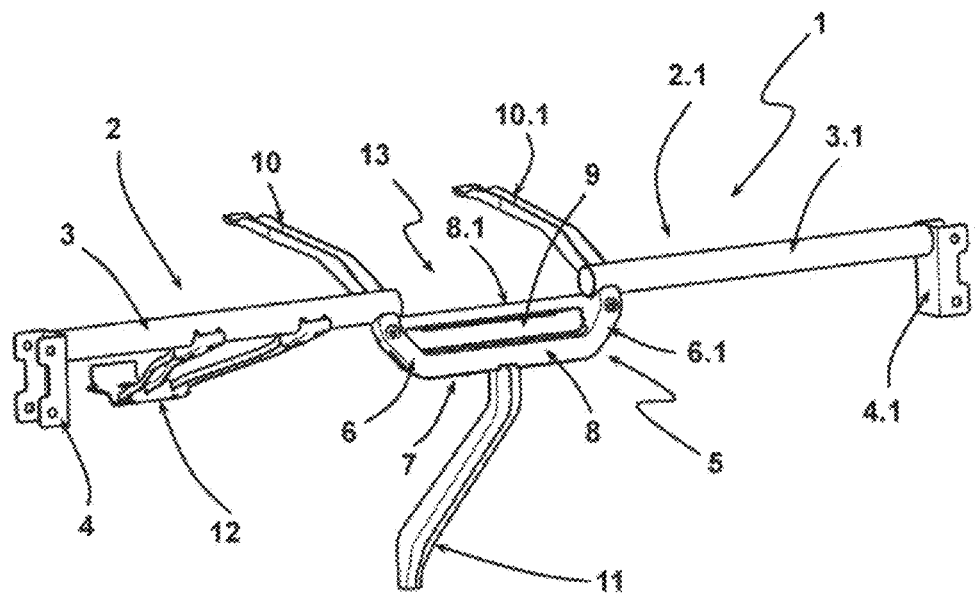
FIG. 1 shows a perspective view of a dashboard carrier.

With reference to FIG. 1, a dashboard carrier 1—which is also called a cross car beam—comprises two subassemblies 2, 2.1 formed as identical parts. Subassembly 2 comprises a hollow carrier profile 3, to the end of which facing away from the other subassembly 2.1 a terminal connector 4 is connected. The terminal connector 4 is used to connect the dashboard carrier 1 to the A-pillar of a motor vehicle. Subassembly 2.1, which is an identical part to subassembly 2, is rotated by 180° with respect to subassembly 2. Hollow carrier profile 3.1 is aligned with hollow carrier profile 3 of subassembly 2. The hollow carrier profiles 3, 3.1 of the two subassemblies 2, 2.1 are arranged at a distance from one another in the y-direction and thus in the longitudinal extension of the dashboard carrier 1. The distance between the ends of the two hollow carrier profiles 3, 3.1 corresponds to approximately 20% of the total length of the dashboard carrier 1 in the example embodiment shown in the figures. The two subassemblies 2, 2.1 are connected to one another via their hollow carrier profiles 3, 3.1 by means of a carrier connector 5. The carrier connector 5 of the example embodiment shown comprises two attachment portions 6, 6.1, between which a carrier portion 7 is located. The attachment portions 6, 6.1 are connected to the carrier portion 7 at an angle, with the attachment portions 6, 6.1 forming an angle of approximately 120° with the carrier portion 7 (see FIG. 2). The attachment portions 6, 6.1 have a contact region against which the lateral surface of a respective hollow carrier profile 3, 3.1 rests. The carrier connector 5 is welded with the ends of attachment portions 6, 6.1 thereof to the respectively adjacent hollow carrier profile 3, 3.1. The carrier connector 5 of the example embodiment shown is a two-shell sheet steel component. It is understood that one-piece pressed steel parts can also be used for this purpose, as well as those produced from an aluminum alloy. The carrier portion 7 is forked, as a result of which it has two legs 8, 8.1 and a passage 9 arranged between the legs 8, 8.1. Furthermore, a cowl connection 10 is connected to the hollow carrier profile 3, specifically in the region of that end portion to which the carrier connector 5 is also connected with the attachment portion 6 thereof. The cowl connection 10 is part of subassembly 2. As a result, subassembly 2.1 designed as an identical part also has a cowl connection 10.1.

In the example embodiment shown, a floor support 11 is connected to the leg 8 of the carrier portion 7 of the carrier connector 5.

The dashboard carrier 1 is therefore composed of three subassemblies, namely subassembly 2 with its hollow carrier profile 3, its terminal connector 4, and the cowl connection 10; subassembly 2.1 with its hollow carrier profile 3.1, its terminal connector 4.1, and the cowl connection 10.1; and the carrier connector subassembly with the carrier connector 5 and the floor support 11 connected thereto. Such a dashboard carrier, which can be used for virtually any vehicle, is customized by connecting the steering column or the pedals. In the example embodiment shown, the steering column connection 12 is on the left-hand side, as viewed in the direction of travel, and is therefore assigned to subassembly 2.

Figure 2:
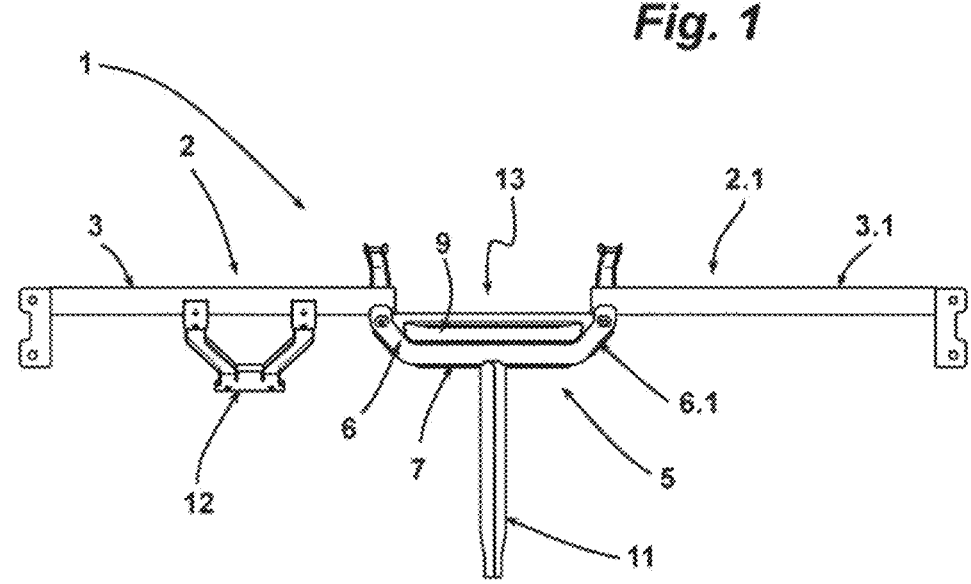
FIG. 2 shows a front view of the dashboard carrier in FIG. 1, as viewed in the direction of travel of the vehicle into which this dashboard carrier is to be installed.

FIG. 2 illustrates the clever introduction of force from the hollow carrier profiles 3, 3.1 of the subassemblies 2, 2.1 into the floor support 11 and thus the floor assembly of the motor vehicle. The floor support 11 is arranged in the middle, which has advantages for symmetrical load absorption in the event of a front crash. At the same time, such a central support creates more legroom for the driver and front passenger.

A particular advantage of the dashboard carrier 1 is the installation space 13 gained by the above-described design of the carrier connector 5, which installation space is between the mutual-facing ends of the hollow carrier profiles 3, 3.1. This installation space 13 can be used to arrange a vehicle assembly therein. The installation space 13 can also be used for an assembly located in front of the dashboard carrier 1 as viewed in the direction of travel, so that the assembly does not act against the dashboard carrier 1 in the event of a front crash, but instead is pushed into the unoccupied installation space 13 in such a case.

Figure 3:
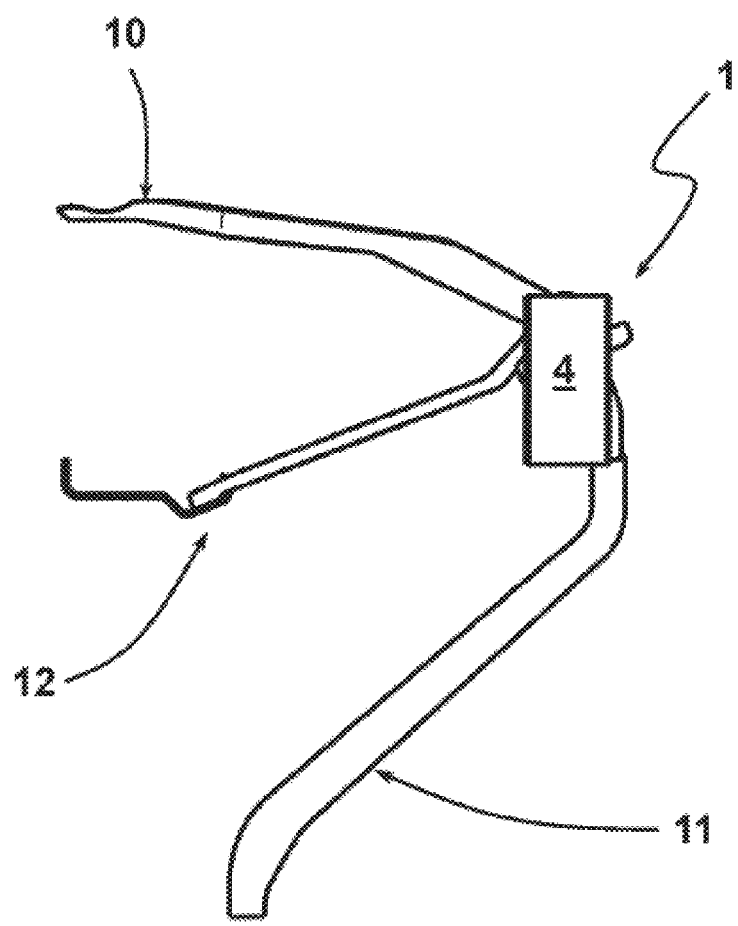
FIG. 3 shows a side view of the dashboard carrier in FIG. 2.

FIG. 3 shows the dashboard carrier 1 in a side view.

The invention has been described on the basis of example embodiments. Without departing the scope of the claims, numerous further embodiments and options result for a person skilled in the art for implementing the invention within the context of the claims, without having to explain or show them in greater detail in the context of this disclosure.

LIST OF REFERENCE NUMERALS

1 Dashboard carrier
2, 2.1 Subassembly
3, 3.1 Hollow carrier profile
4, 4.1 Terminal connector
5 Carrier connector
6, 6.1 Attachment portion
7 Carrier portion
8, 8.1 Leg
9 Passage
10, 10.1 Cowl connection
11 Floor support
12 Steering column connection
13 Installation space

The invention claimed is:

1. A dashboard carrier for a motor vehicle, comprising:
a first hollow carrier profile, a second hollow carrier profile, and a carrier connector, wherein the two hollow carrier profiles are aligned in a longitudinal extension of the dashboard carrier, arranged at a distance from one another, and connected to one another by the carrier connector spanning the distance between the two hollow carrier profiles,
the two hollow carrier profiles are connected to one another, by the carrier connector, eccentrically and asymmetrically in relation to a longitudinal axis of the hollow carrier profiles,
the carrier connector has an attachment portion on each end side thereof and a carrier portion which connects the attachment portions, and each attachment portion is connected to a respective circumferential portion of a lateral surface of the two hollow carrier profiles, and
the carrier portion is arranged at a radial distance from, and in an underside region of, an imaginary lateral surface connecting the lateral surfaces of the two hollow carrier profiles, such that the space located between mutual-facing ends of the hollow carrier profiles is usable as an installation space for an assembly or a component of the vehicle.

2. The dashboard carrier of claim 1, wherein the carrier portion of the carrier connector is forked in relation to the attachment portions.

3. The dashboard carrier of claim 1, wherein the attachment portions are each arranged at an angle >100° to a longitudinal extension of the carrier portion.

4. The dashboard carrier of claim 1, wherein the carrier connector is a two-shell carrier component.

5. The dashboard carrier of claim 1, wherein a single floor support is connected to the carrier connector.

6. The dashboard carrier of claim 1, wherein the two hollow carrier profiles are identical parts.

7. The dashboard carrier of claim 6, wherein terminal connectors are arranged at opposite-facing ends of the hollow carrier profiles for connecting the dashboard carrier to an A-pillar of a motor vehicle, and wherein the hollow carrier profiles together with the terminal connectors are identical parts.

8. The dashboard carrier of claim 1, wherein the hollow carrier profiles are tubular pieces.

9. The dashboard carrier of claim 1, wherein the hollow carrier profiles are hollow chamber profiles composed of half-shells.

10. A dashboard carrier for a motor vehicle, comprising:
a first hollow carrier profile, a second hollow carrier profile, and a carrier connector, wherein the two hollow carrier profiles are aligned in a longitudinal extension of the dashboard carrier, arranged at a distance from one another, and connected to one another by the carrier connector spanning the distance between the two hollow carrier profiles,
the two hollow carrier profiles are connected to one another, by the carrier connector, eccentrically and asymmetrically in relation to a longitudinal axis of the hollow carrier profiles,
the carrier connector has an attachment portion on each end side thereof and a carrier portion which connects the attachment portions, wherein the attachment portions are each arranged at an angle >100° to a longitudinal extension of the carrier portion, and each attachment portion is connected to a respective circumferential portion of a lateral surface of the two hollow carrier profiles, and
the carrier portion is arranged at a radial distance from, and in an underside region of, an imaginary lateral surface connecting the lateral surfaces of the two hollow carrier profiles, such that the space located between mutual-facing ends of the hollow carrier profiles is usable as an installation space for an assembly or a component of the vehicle.

11. The dashboard carrier of claim 10, wherein the carrier portion of the carrier connector is forked in relation to the attachment portions.

12. The dashboard carrier of claim 10, wherein the carrier connector is a two-shell carrier component.

13. The dashboard carrier of claim 10, wherein a single floor support is connected to the carrier connector.

14. The dashboard carrier of claim 10, wherein the two hollow carrier profiles are identical parts.

15. The dashboard carrier of claim 14, wherein terminal connectors are arranged at opposite-facing ends of the hollow carrier profiles for connecting the dashboard carrier to an A-pillar of a motor vehicle, and wherein the hollow carrier profiles together with the terminal connectors are identical parts.

16. The dashboard carrier of claim 14, wherein the hollow carrier profiles are tubular pieces.

17. The dashboard carrier of claim 14, wherein the hollow carrier profiles are hollow chamber profiles composed of half-shells.

18. The dashboard carrier of claim 3, wherein the angle is 120-130°.

19. The dashboard carrier of claim 10, wherein the angle is 120-130°.

\* \* \* \* \*